US008150368B2

(12) United States Patent
Koch et al.

(10) Patent No.: US 8,150,368 B2
(45) Date of Patent: *Apr. 3, 2012

(54) SYSTEM AND METHOD FOR PROVIDING USAGE MONITORING TELEPHONY SERVICES

(75) Inventors: Robert A. Koch, Norcross, GA (US); James C. Bedingfield, Lilburn, GA (US)

(73) Assignee: AT&T Intellectual Property I, L. P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/717,892

(22) Filed: Nov. 20, 2003

(65) Prior Publication Data

US 2004/0101124 A1 May 27, 2004

Related U.S. Application Data

(63) Continuation of application No. 10/245,170, filed on Sep. 17, 2002.

(51) Int. Cl.
*H04W 4/00* (2009.01)

(52) U.S. Cl. .............. 455/406; 379/201.02; 379/221.08; 379/207.01

(58) Field of Classification Search .................. 455/445, 455/417, 432.1–433, 551, 186.1, 461, 405–409, 455/414.1, 456.1, 517, 453; 379/142.07, 379/211.01, 220.01, 220.02, 201.01, 201.02, 379/201.12, 114.01, 114.05, 111, 114, 221.08, 379/207.01; 370/342
See application file for complete search history.

(56) References Cited

U.S. PATENT DOCUMENTS

| | | | |
|---|---|---|---|
| 4,899,373 A | 2/1990 | Lee et al. | |
| 5,353,331 A | 10/1994 | Emery et al. | |
| 5,454,027 A | 9/1995 | Kennedy et al. | |
| 5,758,281 A | 5/1998 | Emery et al. | |
| 5,835,583 A | 11/1998 | Hetz et al. | |
| 5,878,348 A | 3/1999 | Foti | |
| 5,892,821 A | 4/1999 | Turner | |
| 5,915,008 A | 6/1999 | Dulman | |
| 5,933,785 A * | 8/1999 | Tayloe | 455/558 |
| 5,978,678 A | 11/1999 | Houde et al. | |
| 6,014,437 A | 1/2000 | Acker et al. | |
| 6,044,274 A | 3/2000 | Vo et al. | |
| 6,094,478 A | 7/2000 | Shepherd et al. | |
| 6,097,719 A | 8/2000 | Benash et al. | |
| 6,128,495 A | 10/2000 | Sharp et al. | |
| 6,175,622 B1 | 1/2001 | Chiniwala et al. | |
| 6,195,422 B1 * | 2/2001 | Jones et al. | 379/127.05 |
| 6,356,756 B1 * | 3/2002 | Koster | 455/445 |
| 6,411,704 B1 | 6/2002 | Pelletier et al. | |
| 6,529,499 B1 | 3/2003 | Doshi et al. | |
| 6,636,596 B1 | 10/2003 | Gallant et al. | |
| 6,775,546 B1 * | 8/2004 | Fuller | 455/445 |
| 6,873,698 B1 | 3/2005 | Pearson et al. | |
| 2002/0186827 A1 * | 12/2002 | Griffiths | 379/207.02 |
| 2003/0050100 A1 * | 3/2003 | Dent | 455/562 |

* cited by examiner

*Primary Examiner* — Pierre-Louis Desir
(74) *Attorney, Agent, or Firm* — Scott P. Zimmerman PLLC

(57) ABSTRACT

Systems and methods are disclosed for providing a usage monitoring telephony service. A service-providing network, which has the capability of monitoring attributes, including duration, for calls that traverse it, provides usage-monitoring services for calls directed to a telephony device on a native transport network. The native transport network is a network that naturally carries a subscriber's calls but does not have the capabilities required to provide usage monitoring. The system uses a virtual number to map a service in the service-provider network with a device in the native transport network. The usage monitoring services capture usage-monitoring data for multiple telephone numbers in multiple native transport networks.

19 Claims, 5 Drawing Sheets

SYSTEM AND METHOD FOR PROVIDING USAGE MONITORING TELEPHONY SERVICES

CROSS-REFERENCE TO RELATED APPLICATIONS

This application is a continuation of co-pending U.S. application Ser. No. 10/245,170, filed 17 Sep. 2002, and entitled "System and Method for Providing Usage Monitoring Telephony Services."

This application relates to U.S. application Ser. No. 10/245,153, filed 17 Sep. 2002, entitled "SYSTEM AND METHOD FOR PROVIDING ADVANCED TELEPHONY SERVICES USING A VIRTUAL TELEPHONE NUMBER," the disclosure of which is incorporated herein by reference. This patent application also relates to U.S. application Ser. No. 10/245,518, filed 17 Sep. 2002, entitled "SYSTEM AND METHOD FOR PROVIDING ADVANCED TELEPHONY SERVICES USING A VIRTUAL TELEPHONE NUMBER," of which the "Brief Summary of the Invention" section and the "Detailed Description of the Invention" section are incorporated herein by reference.

NOTICE OF COPYRIGHT PROTECTION

A portion of the disclosure of this patent document and its FIG.s contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to telecommunications systems and methods and, more specifically, systems and methods for providing advanced telephony services using elements within a service-providing network, which is separate from the transport network which would normally be used to carry a customer's calls, an example being providing usage monitoring services to a wireless customer using a wireline network-based universal telephone number.

2. Description of the Related Art

Telecommunications service providers, such as regional bell operating companies (RBOC), competitive local exchange carriers (CLEC), Internet-protocol (IP) telephony providers, and the like, utilize a variety of infrastructure elements to support their subscribers. For example, an RBOC network typically includes an advanced intelligent network (AIN). The AIN quickly and efficiently routes and terminates a plurality of telephone calls within and between wireline telephone networks, the public-switched telephone network (PSTN), long distance carrier networks, and/or wireless telephone networks. The AIN includes a plurality of interconnected switches, transfer points, service control points (SCPs), databases, and various other network elements to route the telephone calls to the proper destinations and to provide advanced telephony services.

By utilizing these components, the AIN is capable of providing a plurality of advanced telephony services to a wireline PSTN subscriber during a telephone call, such as call delivery services, call forwarding services, call rescue services, custom ring-pattern services, call logging services, and call reporting services. The AIN may also provide voicemail services, custom messaging services, message notification services, message waiting indicator services, caller identification (caller ID) services, privacy director services, anonymous call rejection services, usage monitoring services, personal identification number (PIN) override services, and the like.

For example, BELLSOUTH's PRIVACY DIRECTOR[SM] service allows a subscriber to screen incoming telephone calls. If a telephone call is received from an unknown or a blocked caller, such as a telemarketer, the caller is presented with a message and a prompt that indicates, "if you [the caller] want this telephone call to be delivered to our [the wireline telephone service provider's] subscriber, you must either record your name so that we may deliver it to our subscriber or unblock your telephone number so that we may look your name up and deliver it to our subscriber." The subscriber then has the option of accepting the telephone call from the now known or unblocked caller, sending the telephone call to voicemail, or presenting the caller with an announcement indicating that the subscriber does not accept telephone calls of this nature.

An example usage monitoring service allows a subscriber to prepay for a "bucket" or predetermined amount of telephone usage time, or to sign an agreement agreeing to pay a plurality of different rates for a plurality of predetermined levels of telephone usage time. For example, the subscriber may agree to pay a higher rate for a relatively low level of telephone usage time and a lower rate for a relatively high level of telephone usage time. In any case, such a usage monitoring service requires a telephone service provider to keep careful track of the subscriber's telephone usage time, possibly across more than one network, e.g., a wireline and wireless network if the single bucket of usage time can apply to both wireline and wireless calls.

Unfortunately for many service providers, the infrastructure necessary to support such advanced telephony features is prohibitively expensive. Many competitive local-exchange carriers, wireless telephone service providers, IP-based telephone service providers, and the like cannot afford the expense of installing and maintaining this infrastructure. Thus, many of the advanced telephony services described above are not available to their subscribers. Conversely, embedded infrastructures to provide such services may exist in other networks and not be fully utilized because of the inability to reach subscribes in other telecommunications networks.

Thus, what are needed are systems and methods for providing advanced telephony services to subscribers in telecommunications systems lacking the infrastructure to support these advanced services by accessing capabilities in other networks that can provide such services.

BRIEF SUMMARY OF THE INVENTION

Embodiments of the present invention provide advanced telephony services to telephone numbers served by telecommunications networks lacking the infrastructure to provide these advanced services directly. For purposes of clarity, the following definitions are made. A service-providing network is a network with the capability of providing advanced telephony services to a service subscriber for calls that traverse it. A native transport network is a network that naturally carries a subscriber's calls but does not have the capabilities required to provide advanced services. In one embodiment, a telephone number in a service-providing network utilizes a service provided by an element in its network. The service-providing network element provides the services to a telephone in a second telecommunications network, which is in communication with the service-providing network, using the same telephone number.

The telecommunications networks providing and utilizing the advanced services may be wireline or wireless. They may rely on circuit or packet-switching technologies. Some embodiments may utilize combinations of several types of networks. The network elements providing the services may be based on advanced intelligent network (AIN), Internet protocol (IP), or other relevant standards. For example, in one embodiment, the network element that provides the advanced service is a service control point (SCP). In other embodiments, the element may be a media gateway controller, softswitch, application server, web server, media server, media gateway, or some combination thereof.

One of the embodiments may provide any number of services. For example, the services may include one or more of the following: a call delivery service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, and a personal identification number (PIN) override service.

More of the embodiments allow the service-providing network to monitor the usage (e.g., to provide a billing service) of a telecommunications service in a separate native transport network. For example, a wireline service provider may use an embodiment to monitor usage for a subscriber in a wireless network (in addition to within the wireline network).

In another of the embodiments of the present invention, a service-providing network monitors various aspects of a communication for a subscriber whose telephone number exists in a separate native transport network. In still another of the embodiments, the service-providing network monitors the start and end times of a communication to or from the subscriber's telephone number. By monitoring the start and end times of the communication, the service-providing network is able to calculate a communication duration. The service-providing network is therefore able to provide a logging, billing, or other service that either already exists or is easily provided by the service-providing network, but that would otherwise be prohibitively expensive or otherwise impractical to build in the native transport network. In yet another of the embodiments, the service-providing network monitors the status of a call, such as "Call Complete," "Line Busy," or "Call Terminated."

Another of the embodiments describes associating a subscriber's telephone number in a native transport network with advanced services in another network (a service-providing network). A wireline service provider establishes a virtual telephone number in a first network (e.g., a wireline network) and associates services with the virtual telephone number. A second service provider, a wireless, wireline, or packet voice-based network then associates a subscriber's telephone number in the second network with the virtual telephone number in the first network. In another embodiment, the telephone number in the first network is not a virtual number, but instead is the subscriber's number in the first network. When a call is directed to or is made from the second number, the call is routed to the first number so that advanced services can be provided by the first (service-providing) network. Once the service is provided, the call is routed to the original destination. In such an embodiment, therefore, an advanced service that is provided using elements of a wireline (service-providing) network is made available to a subscriber whose telephone number does not exist within that network, but rather exists within a wireless (native transport) network.

The service provider in the native transport network may associate the two telephone numbers through various means. In one embodiment, the native transport network includes a data store for storing the association. This data store may be a database or other appropriate data storage device. The data store may include additional information necessary to effectively and efficiently deliver the advanced service. For example, the data store includes a user profile. The user profile includes information about the subscriber and associates the two telephone numbers. The profile may also include information regarding a subscriber's service preferences.

In a method according to the present invention, once the provider of the native transport network associates the two telephone numbers, calls directed to the number in the native transport network receive advanced telephony services provided by a network element in the service-providing network. After the network element in the service-providing network provides the services, the call continues to the intended destination. Modifications to the network messaging accompanying calls may also be provided to ensure, for example, that a correct caller ID is displayed at the terminating end of the telephone call. A system according to the present invention may utilize conventional switches and other AIN network elements, softswitches, or other application servers, as they are developed and deployed.

The service-providing network provider may bill a monthly charge for utilizing an advanced service or bills a charge each time the service is used. The service-providing network provider may also bill for each additional telephone number utilizing advanced services from another (native transport) network.

Embodiments of the present invention provide numerous advantages over conventional systems and methods. The embodiments provide systems and methods for providing advanced telephony services, such as those provided in a conventional AIN, to a subscriber in another wireline, wireless, or packet voice-based network without the need for true, prohibitively expensive service-providing elements. The present invention also provides systems and methods that allow a large, well-established service provider, with the financial resources necessary to design, deploy, and maintain an infrastructure capable of supporting such advanced services, to increase revenue by reaching a broader market that includes wireline, wireless, and packet voice-based telephone subscribers, which would be otherwise unreachable.

In addition, embodiments of the present invention provide great flexibility to a service provider in providing a subscriber access to these services. The service provider is able to disassociate a subscriber's telephone number from a physical "loop" or telephony network. This disassociation occurs in ordering systems, support systems, billing systems, and in the physical "loop" or telephony network. In other words, in various embodiments of the present invention, a subscriber's advanced telephony services are available across platforms.

BRIEF DESCRIPTION OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
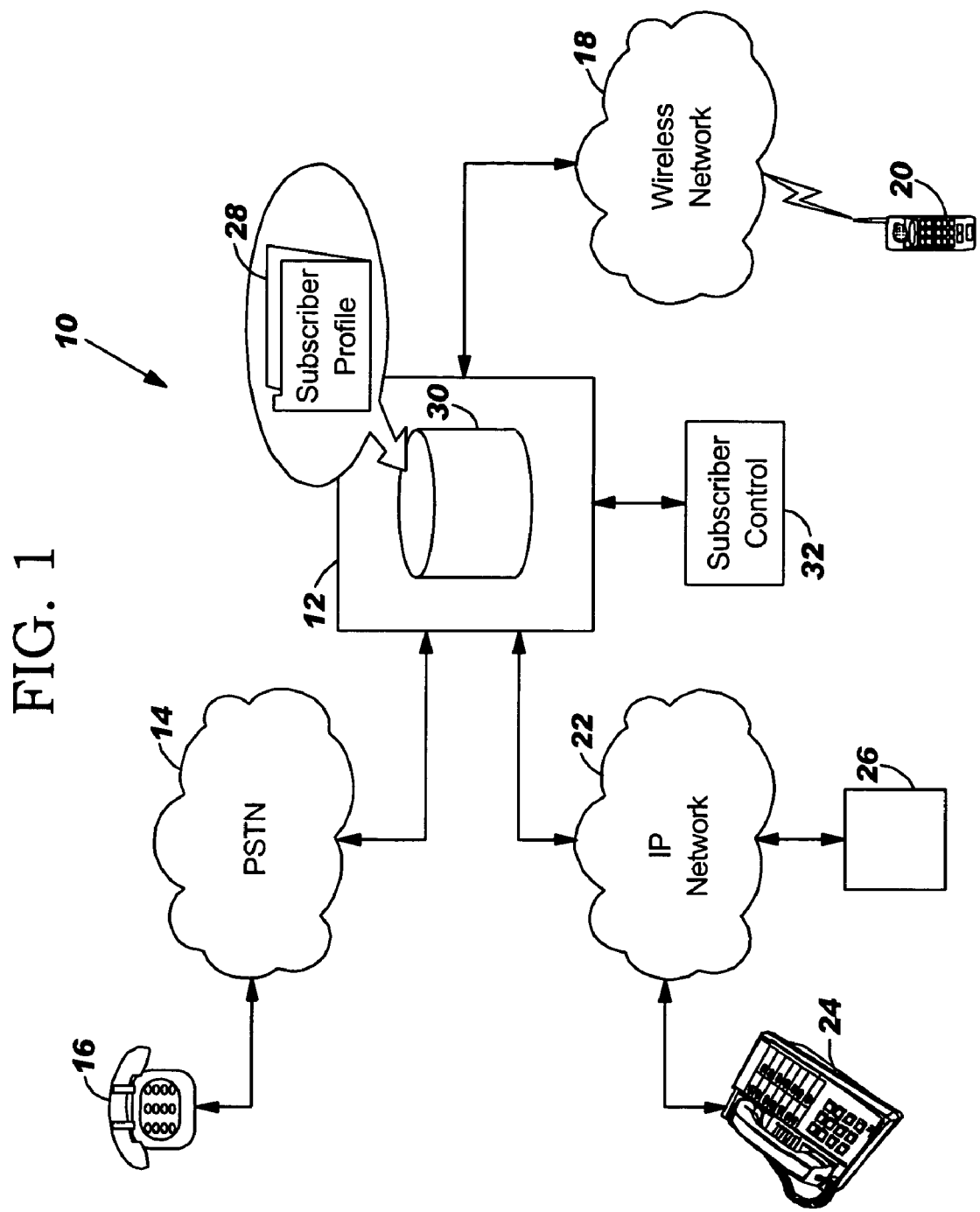
FIG. 1 is a schematic diagram of one embodiment of a system for providing advanced telephony services to a plurality of subscribers using a virtual telephone number.

FIG. 1 is a schematic diagram of one embodiment of a system for providing advanced telephony services to a plurality of subscribers. FIG. 1 shows a system 10 for providing advanced telephony services to a plurality of subscribers. The system 10 routes telephone calls into or out of a telecommunications network 12 belonging to a telecommunications service provider. This telecommunications network 12 is also referred to herein as a service-providing network because all communications that take advantage of the advanced telephone services are routed through the telecommunications network 12. The telecommunications network 12 includes a switch and an application server, and each is described below. The application server is operable for providing a plurality of advanced telephony services to a subscriber for each telephone call. In an AIN environment, the application server may be an SCP. Other network elements, including, but not limited to softswitches, media gateway controllers, web servers, media servers, and media gateways, may also be included in telecommunications network 12 to provide the advanced telephony services. These advanced telephony services may include, for example, call delivery services, call forwarding services, call rescue services, custom ring-pattern services, call logging services, and call reporting services. The application server may also provide voicemail services, custom messaging services, message notification services, message waiting indicator services, caller identification (caller ID) services, privacy director services, anonymous call rejection services, usage monitoring services, personal identification number (PIN) override services, and the like.

The telecommunications network 12 is in communication with a plurality of callers, subscribers, and/or other individuals via a public-switched telephone network (PSTN) 14, which includes incumbent local exchange carriers (ILEC), competitive local exchange carriers (CLEC), and inter-exchange carriers (IXC). In the embodiment shown, the telecommunications network 12 is directly or indirectly in communication with a subscriber's wireline telephones or devices, such as a home telephone 16. The telecommunications network 12 is also in communication with a plurality of callers, subscribers, and/or other individuals via a wireless telephone network 18. The telecommunications network 12 also is directly or indirectly in communication with the subscriber's wireless telephone or device, such as a cellular telephone 20. The telecommunications network 12 is further in communication with a plurality of callers, subscribers, and/or other individuals via a packet voice or Internet Protocol (IP)-based telephone network 22. The telecommunications network 12 is directly or indirectly in communication with a subscriber's IP-based telephony device 24 and/or a notification device 26.

In the embodiment shown in FIG. 1, a subscriber profile 28 is disposed within a database 30 that resides in the telecommunications network 12. The subscriber profile 28 contains information related to a subscriber's advanced telephony service preferences, e.g., the advanced telephony services that are associated with the subscriber's incoming and outgoing telephone calls. The subscriber adds to, subtracts from, or otherwise modifies these advanced telephony services preferences via a subscriber control 32, such as a wireline link, a wireless link, an Internet web page, an intranet web page, or the like. The subscriber profile 28 and the subscriber control 32 provide a subscriber with control over the identity and nature of the advanced telephony services that are provided to telephone calls associated with the subscriber or with a telephone number associated with the subscriber.

Figure 2:
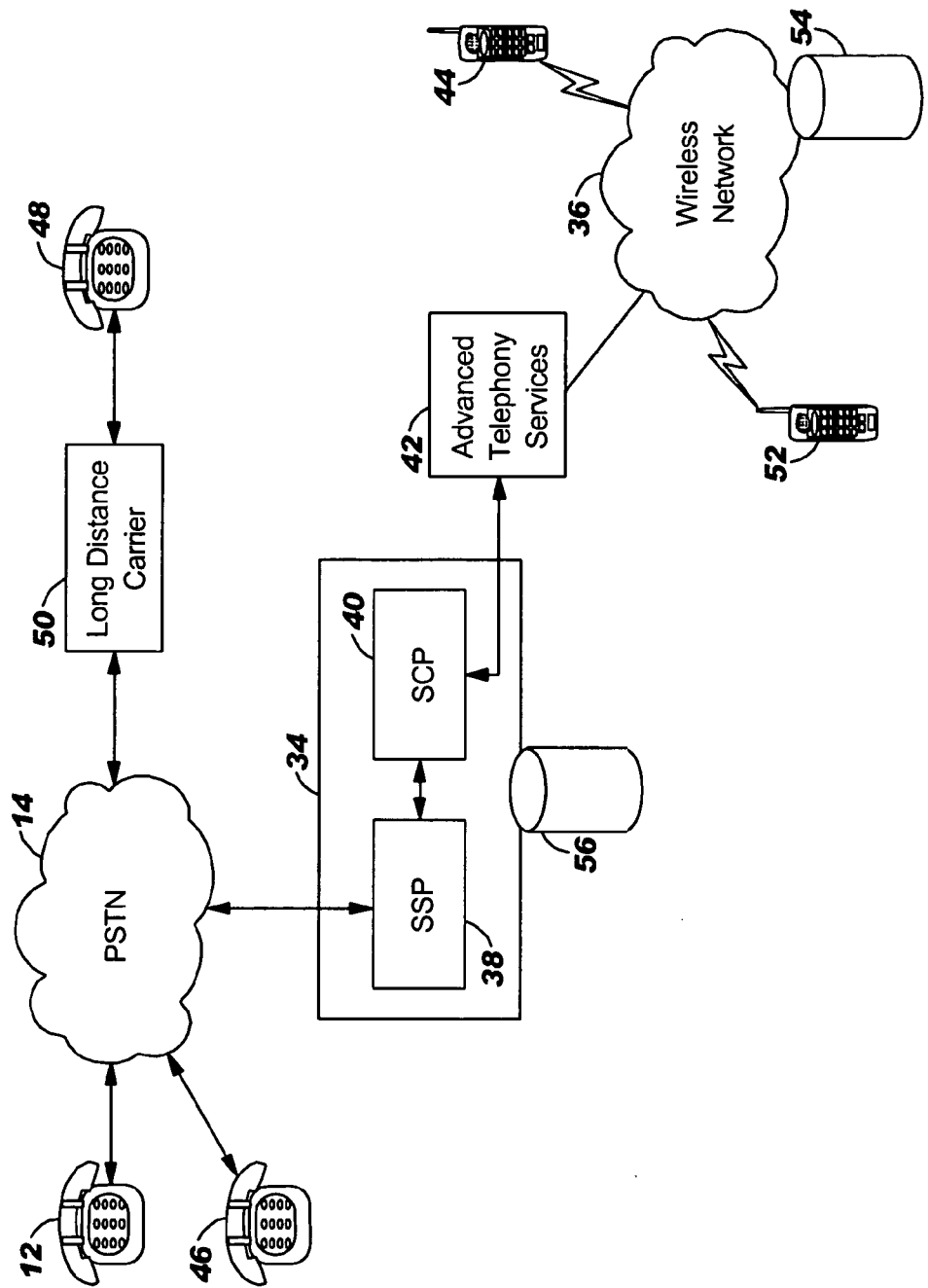
FIG. 2 is a schematic diagram of another embodiment of the system for providing advanced telephony services to a plurality of subscribers using a virtual telephone number, highlighting the use of a wireline telephone number to provide advanced wireless telephony services to a subscriber.

Referring to FIG. 2, in one embodiment of the present invention, the system 10 for providing advanced telephony services to a plurality of subscribers includes a wireline carrier network 34 in communication with a wireless carrier network 36. In the embodiment shown, the wireline network 34 is the service-providing network and the wireless network 36 is the native transport network. In other embodiments, both the service-providing network 34 and the native transport network 36 can be either a wireline, wireless, packet voice-based, or other type of telecommunications network. In the embodiment shown, the wireline network 34 is an advanced intelligent network (AIN). An AIN includes a plurality of hardware and software elements operating over industry standard communication protocols, including Signaling System 7 (SS7). For the sake of brevity, only a basic description of the AIN is provided here. For further information regarding aspects of the AIN, refer to Weisser, U.S. Pat. No. 5,430,719, which is incorporated herein by reference. Although described in detail with reference to the AIN of FIG. 2, embodiments of the present invention may utilize other types of wireline and wireless networks such as packet-switching networks.

In the embodiment shown in FIG. 2, the wireline carrier network 34 includes a service switching point (SSP) 38 in communication with a service control point (SCP) 40. The SSP 38 is a central office switch that provides intelligent network functionality. When a call is placed or received at the SSP 38, the SSP 38 collects the dialed digits and generates a trigger. A trigger generates a packet that is sent to the SCP 40. The SCP 40 includes computer processors, application software, and databases that control the routing, monitoring, processing, and termination of phone calls. In the embodiment shown, the SCP 40 is operable for providing a plurality of advanced telephony services 42 to a subscriber 44, such as a wireless subscriber in the example shown. For example, the SCP 40 may be operable for providing a privacy director service or a usage monitoring service to the subscriber 44 and the telephone call.

In one embodiment, a caller 12 places a call by dialing the subscriber's listed telephone number, which exists in the wireline network 34. When the telephone call encounters the wireline telephone number at the SSP 38, a terminating attempt trigger (TAT) or other similar terminating trigger is generated. Any and all services for the subscriber are subsequently provided by the network intelligence in the wireline (service-providing) network 34. Following the application of subscribed advanced services, the service-providing (wireline) network 34 forwards the call to the wireless telephone number associated with the wireline telephone number. The call is routed to the native transport (wireless) network 36 and is then completed to the subscriber's wireless telephone 44. Accordingly, advanced services are applied by the wireline network 34 for a call whose native transport would normally be the wireless network 36 with limited or no advanced services capabilities.

The wireline network 34 and the SSP 38 are in communication with a plurality of callers, such as a first wireline caller 46 via the PSTN 14 and a second wireline caller 48 via a long distance or inter-exchange carrier network 50. The wireless network 36 is also in direct communication with a plurality of callers, such as a third caller 52. The wireline carrier network 34 includes components, such as the SCP 40, necessary to provide services. A first database 54 resides within the wireless carrier network 36 and a second database 56 resides with the wireline carrier network 34. Both the first database 54 and the second database 56 are associated with algorithms, which are operable for associating a wireline or virtual telephone number, with another telephone number, such as another wireline telephone number, a wireless telephone number, or a packet voice-based telephone number. Alternatively, the algorithms may be operable for associating a telephone number assigned to a wireline network with the wireless service provider's subscriber. By assigning a virtual telephone number or other telephone number to the subscriber's wireless telephone number, the service provider is able to disassociate the services from the physical device and even the wireless telephone number. Advantageously, advanced telephony services are associated with this virtual telephone number. In the example shown, the first database 54, the second database 56, and the associated algorithms are operable for associating a wireline telephone number with a wireless telephone number associated with the subscriber 44.

Figure 3:
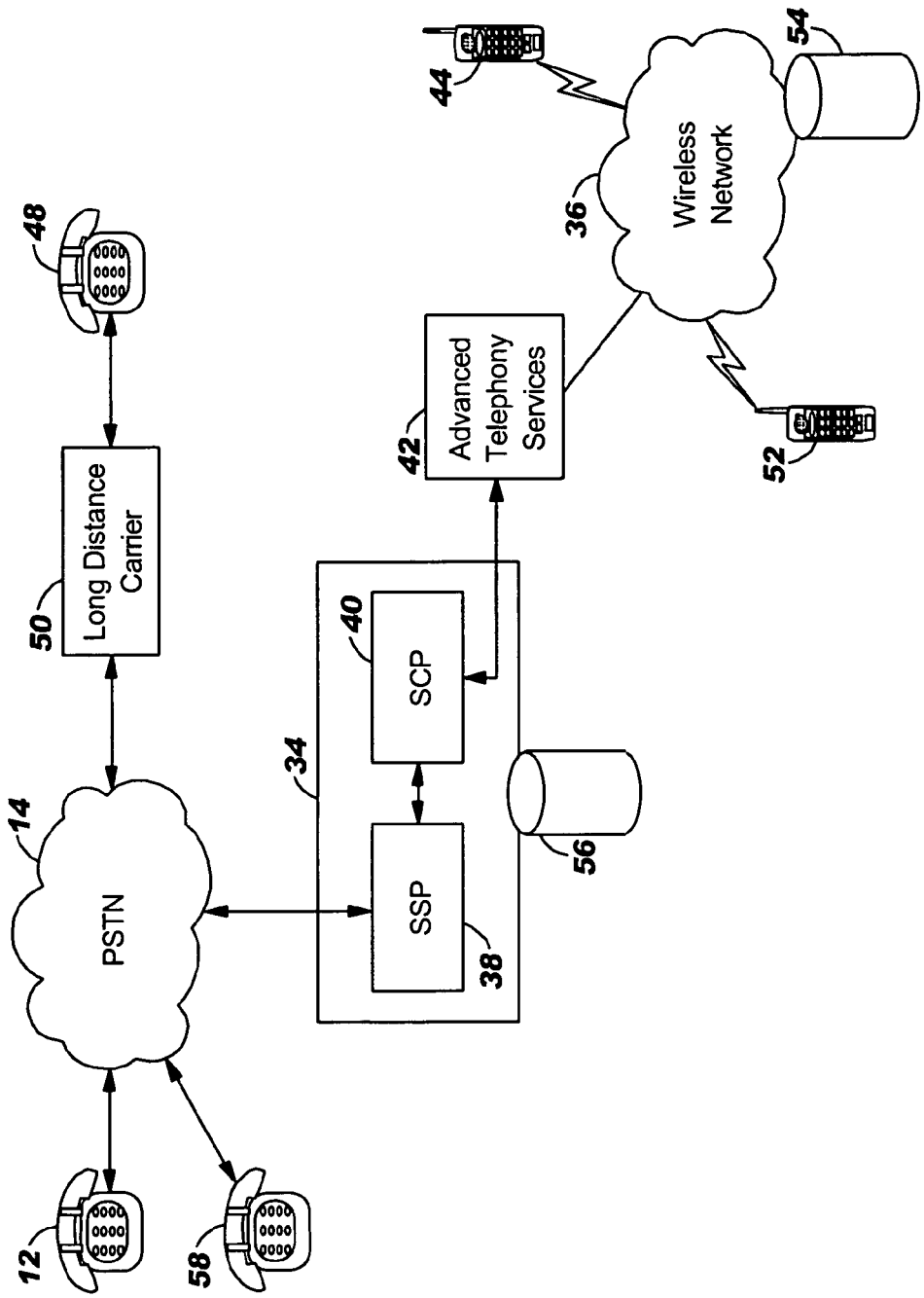
FIG. 3 is a schematic diagram of a further embodiment of the system for providing advanced telephony services to a plurality of subscribers using a virtual telephone number, highlighting the use of a wireline telephone number to provide advanced wireless telephony services to a subscriber and an alternative wireline telephone or device.

Referring to FIG. 3, in a further embodiment of the present invention, the system 10 for providing advanced telephony services to a plurality of subscribers using a virtual telephone number also includes a wireline telephone or device 58 belonging to the subscriber 44 and in direct communication with the wireline carrier network 34 and the SSP 38. Telephone calls to the subscriber 48 at the wireless telephone number routed through the wireline carrier network 34 may be terminated to the wireline telephone or device 58 in the event that the subscriber's wireless telephone or device 44 is unavailable.

Figure 4:
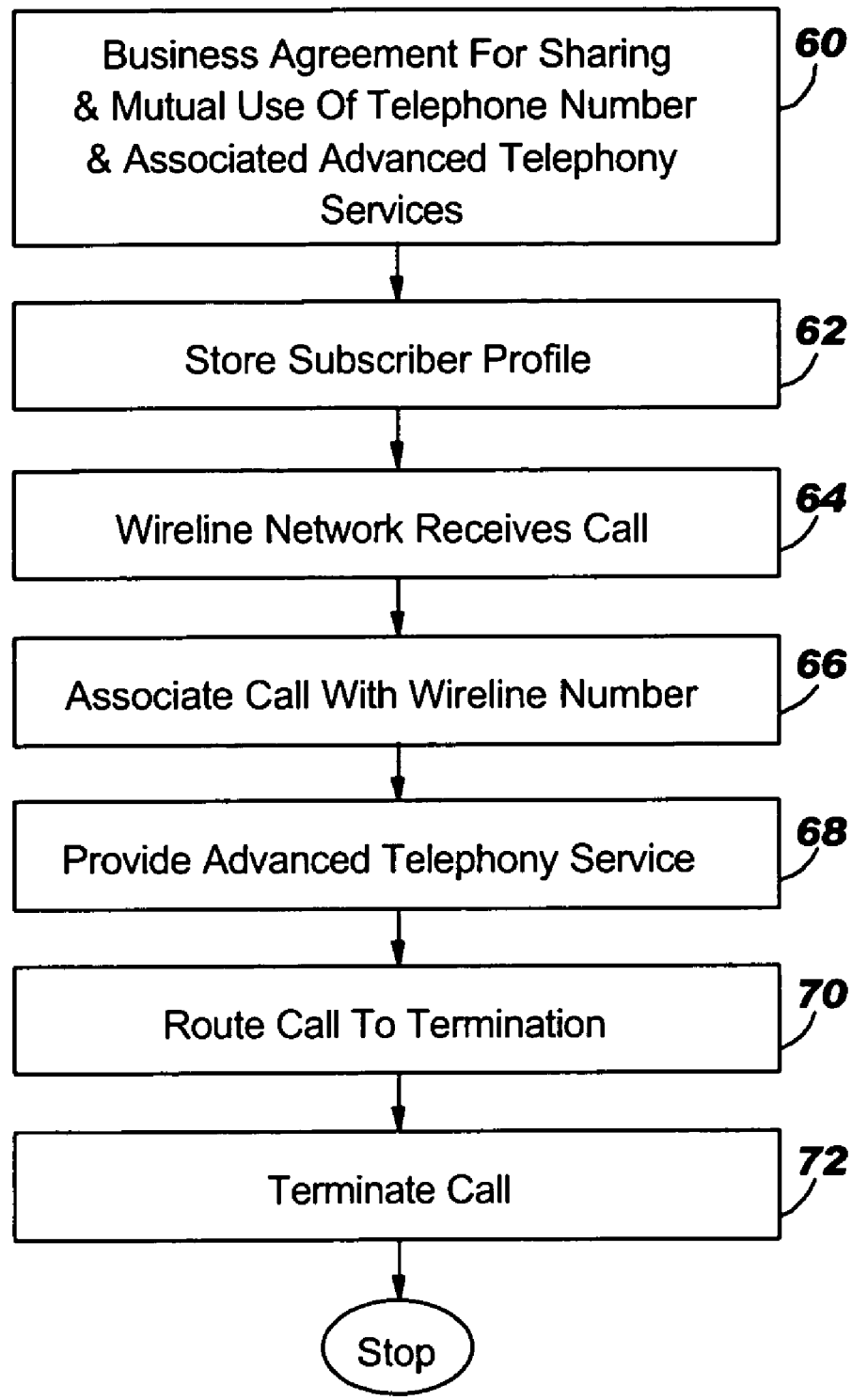
FIG. 4 is a flow chart of one embodiment of a method for providing advanced telephony services to a plurality of subscribers using a virtual telephone number.

Referring to FIG. 4, in one embodiment of the present invention, a method for providing advanced telephony services to a plurality of subscribers using a virtual telephone number includes a wireline telephone service provider and another wireline telephone service provider (such as a competitive local exchange carrier (CLEC) or an inter-exchange carrier), a wireless telephone service provider, and/or a packet voice-based telephone service provider reaching a business agreement regarding the sharing and mutual use of a telephone number, such as a wireline telephone number, with which advanced telephony services are associated (Block 60). The wireline telephone service providers, the wireless telephone service provider, and/or the packet voice-based telephone service provider each store a subscriber profile in a database residing in the wireline telephone networks 56, the wireless telephone network 54, and/or the packet voice-based telephone network (Block 62). A telephone call that is intended to be completed to the wireless network is received first in the wireline telephone network (Block 64) (by virtue of the wireless/wireline number association accomplished by Blocks 60-66). The wireless telephone number, and/or the packet voice-based telephone number associated with the telephone call is associated with the wireline telephone number to which services are associated (Block 66). The telephone number to which services are associated may be, for example, the subscriber's home or business telephone number. However, embodiments of the present invention are not limited to telephone numbers linked to physical terminating devices in a home or residence. In one embodiment, the telephone number is a "virtual" telephone number created expressly to support the association of advanced services in the wireline network (shown as reference numeral 34 in FIG. 3) in an embodiment of the present invention. In another embodiment, the telephone number is an actual number that is associated with the subscriber. Although either type of number may be used, for the sake of simplicity in describing embodiments of the present invention, the telephone number to which services are associated will hereinafter be referred to as the "virtual telephone number."

Referring again to FIG. 4, the service-providing network (the wireline telephone network associated with the virtual directory number) provides advanced telephony services for the call (Block 68). The SCP 40, by utilizing the subscriber profile 28 disposed within the database 56 residing within the wireline telephone network 34 associated with the virtual telephone number, and an associated algorithm, provides an advanced telephony service to the telephone call. Finally, the SCP 40 or the SSP 38 routes the telephone call to the appropriate telecommunications network, such as wireline telephone network 34, wireless telephone network 36, or packet voice-based telephone network 22 (Block 70). The call is then terminated to the appropriate wireline telephone or device, wireless telephone or device, or packet voice-based telephone or device (Block 72).

Changes to the telecommunications networking messages may be necessary to properly handle the call. For example, after the wireline network 34 provides advanced telephony services to the telephone call, the wireline network 34 routes the call to the network in communication with the terminating device. When routing the call back to the terminating devices network, the wireline network 34 modifies the messages accompanying the call so that the call is not routed back to the wireline network 34 in an endless loop. The wireline network 34 may also make other modifications. For example, to accurately reflect the party placing to call to the subscriber, the caller m information associated with the call may be modified.

Figure 5:
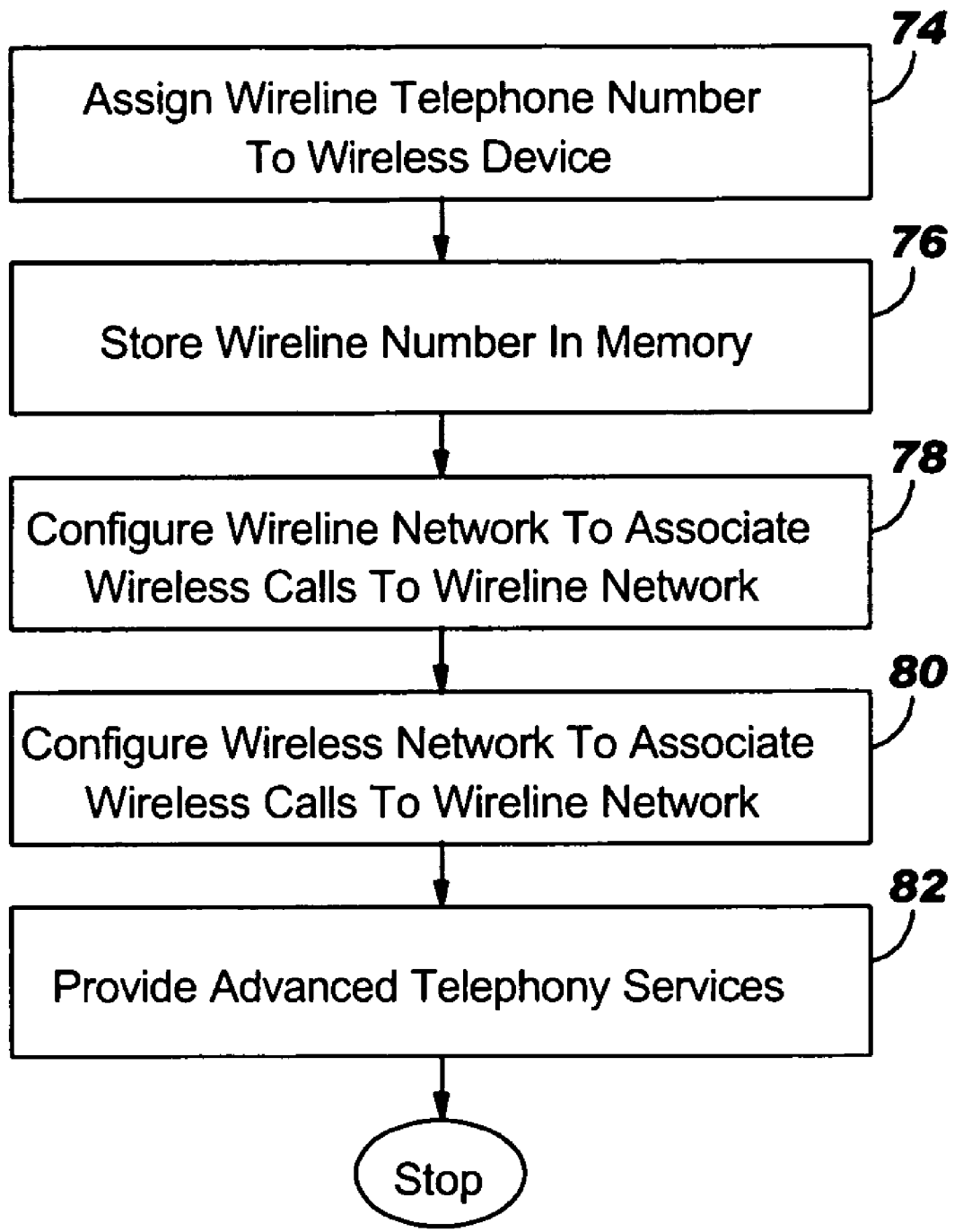
FIG. 5 is a flow chart of another embodiment of the method for providing advanced telephony services to a plurality of subscribers using a virtual telephone number, highlighting the use of a wireline telephone number to provide advanced wireless telephony services to a subscriber.

Referring to FIG. 5, in an alternative embodiment of the present invention, a wireline telephone number is assigned to a wireless subscriber, i.e., to a wireless telephone or device having a wireless telephone number (Block 74). Optionally, this wireline telephone number is disposed within a memory device of the wireless telephone or device (Block 76). The service provider then configures the wireline carrier network 34 such that telephone calls to the wireless telephone number may be routed to the wireline carrier network (Block 78) and associated with the wireline telephone number. The wireless service provider also configures the wireless carrier network 36 such that telephone calls originating from the wireless telephone or device 44 may be routed through the wireline carrier network 34 (Block 80) and associated with the wireline telephone number. Predetermined advanced telephony services are provided to the telephone calls associated with the wireline directory number (Block 82) prior to the telephone calls being routed to the proper destination.

The processes and the functions of the structures involved in embodiments of the present invention are illustrated below in the following examples.

EXAMPLE #1

Wireline Caller Calls Wireless Subscriber

When a wireline caller calls a wireless subscriber at a conventional wireless telephone number, via the PSTN or a long distance carrier network, the wireless or other service provider routes the telephone call to a wireline carrier network configured to provide advanced telephony services to a virtual telephone number associated with the wireless telephone number. This association is carried out by a database and an algorithm disposed within the wireline carrier network operable for associating the conventional wireless telephone number with the virtual telephone number. An SCP provides a plurality of advanced telephony services to the telephone call, such as a privacy director service, a usage monitoring service, an audio calling name service, or the like. The SCP or other network element then routes the telephone call to the wireless carrier network associated with the conventional wireless telephone number and is terminated to the wireless telephone or device associated with the conventional wireless telephone number.

EXAMPLE #2

Wireless Caller Calls Wireless Subscriber

When a wireless caller calls the wireless subscriber at the conventional wireless telephone number, via a wireless carrier network, the conventional wireless telephone number is associated with a virtual telephone number within the wireless carrier network. This association is carried out by a database and an algorithm disposed within the wireless carrier network operable for associating the conventional wireless telephone number with the virtual telephone number. The wireless carrier network routes the telephone call to the wireline carrier network associated with the virtual telephone number, and the SCP provides a plurality of advanced telephony services to the telephone call, such as the privacy director service, the usage monitoring service, the audio calling name service, or the like. The SCP then routes the telephone call to the wireless carrier network associated with the conventional wireless telephone number and to the wireless telephone or device associated with the conventional wireless telephone number.

EXAMPLE #3

Wireless Subscriber Calls Wireline Party

When the wireless subscriber at the conventional wireless telephone number calls a wireline party, via the wireless carrier network, the conventional wireless telephone number is associated with a virtual telephone number within the wireline carrier network. This association is carried out by a database and an algorithm disposed within the wireless carrier network operable for associating the conventional wireless telephone number with the virtual telephone number. The telephone call is then routed to the wireline carrier network associated with the virtual telephone number and the SCP provides a plurality of advanced telephony services to the telephone call, such as the privacy director service, the usage monitoring service, the audio calling name service, or the like. The telephone call is then routed to a wireline carrier network, the PSTN, and/or a long distance carrier network associated with the wireline telephone number associated with the wireline party and is terminated to the wireline telephone or device associated with wireline telephone number associated with the wireline party.

EXAMPLE #4

Wireless Subscriber Calls Wireless Party

When the wireless subscriber at the conventional wireless telephone number calls a wireless party, via the wireless carrier network, the conventional wireless telephone number is associated with a virtual telephone number within the wireline carrier network. This association is carried out by a database and an algorithm disposed within the wireless carrier network operable for associating the conventional wireless telephone number with the virtual telephone number. The telephone call is then routed to the wireline carrier network associated with the virtual telephone number and the SCP provides a plurality of advanced telephony services to the telephone call, such as the privacy director service, the usage monitoring service, the audio calling name service, or the like. The telephone call is then routed to a wireless carrier network associated with the wireless telephone number associated with the wireless party and is terminated to the wireless telephone or device associated with wireless telephone number associated with the wireless party.

An embodiment of the present invention may include other or additional features. For example, in one embodiment, the SCP is in communication with a web server via a Transmission Control Protocol/Internet Protocol (TCP/IP). The subscriber profile and/or the subscriber preferences related to the plurality of advanced telephony services may be stored in the web server. Advantageously, this configuration combines the reliability of the wireline telephone service provider's network with the flexibility of the Internet via the SCP.

When a telephone call originates from or is terminated to the subscriber's wireline telephone number, the web server is queried for the subscriber profile and/or the subscriber preferences related to the plurality of advanced telephony services. The SCP acts as a "protocol interpreter." The subscriber profile and/or the subscriber preferences related to the plurality of advanced telephony services may be added to, subtracted from, and/or modified by the subscriber via, for example the Internet and a personal computer (PC).

As described above, a usage monitoring service allows a subscriber to prepay for a "bucket" or predetermined amount of telephone usage time, or to sign an agreement agreeing to pay a plurality of different rates for a plurality of predetermined levels of telephone usage time. For example, the subscriber may agree to pay a higher rate for a relatively low level of telephone usage time and a lower rate for a relatively high level of telephone usage time. In any case, the usage monitoring service requires a wireline telephone service provider to keep careful track of the subscriber's telephone usage time across various disparate networks, e.g., wireline, wireless, and packet voice-based.

The systems and methods of the present invention allow a wireline telephone service provider to keep track of a subscriber's telephone usage time. Advantageously, this telephone usage time can be tracked and monitored for any combination of wireline telephone or device, wireless telephone or device, or packet voice-based telephone or device associated with the virtual directory number. Preferably, an algorithm disposed within the wireline telephone network associated with the virtual telephone number performs this tracking and monitoring, and the resulting data and information is stored in a database within the wireline telephone network. The algorithm counts usage minutes any time a call is received from or routed to the virtual telephone number. Thus, the wireline telephone service provider associated with the virtual telephone number and other wireline telephone service providers, wireless telephone service providers, and packet voice-based telephone service providers using the virtual telephone number may offer a universal usage monitoring service, covering all of a subscriber's telephones or devices. Such a usage monitoring service might be a billing service or call logging service. The wireline (service-providing) network in which the virtual telephone number exists is able to perform this functionality since it is embedded within the call path for the duration of the call and is therefore able to monitor connection start times, end times, durations, and other call control signaling events.

When a service provider provides services, a billing system in communication with the service provider's network gathers information necessary for generating a bill. In one embodiment of the present invention, a service management system (SMS) (not shown) creates and maintains the necessary billing records for each subscriber activating or using advanced telephony services. In another embodiment, the SCP creates and maintains billing records for each subscriber.

Although the present invention has been shown and described with reference to preferred embodiments and examples thereof, other embodiments and examples may achieve the same results and/or perform similar functions. Accordingly, changes in and modifications to the present invention will be apparent to those of ordinary skill in the art without departing from the spirit or scope of the present invention. The following claims are intended to cover all such equivalent embodiments and examples.

What is claimed is:

1. A method, comprising:
   receiving a call to a dialed number from a native transport network having limited capability of providing advanced telephony services;
   storing a profile in a database that associates preferences for the advanced telephony services;
   retrieving a preference associated with the dial number and with an advanced telephony service;
   associating the dialed number to a virtual telephone number;
   routing the call in a service-providing network to receive the advanced telephony service;
   providing the advanced telephony service to the call by the service-providing network;
   routing the call from the service-providing network to a terminating network destination; and
   monitoring a duration of the call traversing the service-providing network.

2. The method of claim 1, further comprising monitoring a status of the call.

3. The method of claim 1, further comprising routing the call via the native transport network.

4. The method of claim 1, wherein the service-providing network is selected from a group consisting of a wireline network, a wireless network, and a packet-switching network.

5. The method of claim 1, further comprising associating the virtual telephone number to a wireless telephone number.

6. The method of claim 1, further comprising associating the virtual telephone number to another telephone number.

7. The method of claim 1, wherein the native transport network is selected from a group consisting of a wireline network, a wireless network, and a packet-switching network.

8. The method of claim 1, further comprising billing for monitoring the duration of the call.

9. The method of claim 1, further comprising billing a subscriber based on the duration of the call.

10. A system for monitoring communications usage, the system comprising:
    a processor executing software stored in memory that causes the processor to:
    receive a call to a dialed number routed from a native transport network having limited capability of providing advanced telephony services;
    store a profile in a database that associates preferences for the advanced telephony services;
    associate the dialed number to an advanced telephony service;
    retrieve a preference from the profile that is associated with the advanced telephony service;
    associate the advanced telephony service to a virtual telephone number;
    associate the dialed number to the virtual telephone number;
    route the call from in a service-providing network to receive the advanced telephony service;
    provide the advanced telephony service to the call by the service-providing network;
    route the call from the service-providing network to a terminating network destination; and
    monitor a duration of the call traversing the service-providing network.

11. The system of claim 10, wherein the software further causes the processor to monitor a status of the call.

12. The system of claim 10, wherein the software further causes the processor to route the call via the native transport network.

13. The system of claim 10, wherein the software further causes the processor to associate the virtual telephone number to another telephone number.

14. The system of claim 10, wherein the software further causes the processor to associate a calling number to the advanced telephony service.

15. The system of claim 10, wherein the service-providing network comprises an Advanced Intelligent Network (AIN).

16. The system of claim 10, wherein the service-providing network comprises a packet-switching network.

17. The system of claim 10, wherein the software further causes the processor to modify messages accompanying the call.

18. The system of claim 10, wherein the software further causes the processor to modify caller information associated with the call.

19. Non-transitory memory storing software that causes a processor to perform a method, the method comprising:
    receiving a call to a dialed number routed a native transport network having limited capability of providing advanced telephony services;
    storing a profile in a database that associates preferences for the advanced telephony services;
    associating the dialed number to an advanced telephony service;
    retrieving a preference from the profile that is associated with the advanced telephony service;
    associating the advanced telephony service to a virtual telephone number;
    routing the call in a service-providing network to receive the advanced telephony service;
    providing the advanced telephony service to the call by the service-providing network;
    routing the call from the service-providing network to the dialed number; and
    monitoring a duration of the call traversing the service-providing network.

* * * * *